US005558423A

United States Patent [19]

Schatka et al.

[11] Patent Number: 5,558,423

[45] Date of Patent: Sep. 24, 1996

[54] HEADLIGHTS FOR MOTOR VEHICLES

[75] Inventors: Wilhelm Schatka; Ralf Seiger, both of Lippstadt; Josef Wieneke, Bad Westernkotten, all of Germany

[73] Assignee: Hella KG Hueck & Co., Lippstadt, Germany

[21] Appl. No.: 511,869

[22] Filed: Aug. 7, 1995

[30] Foreign Application Priority Data

Dec. 17, 1994 [DE] Germany .......................... 44 45 187.3

[51] Int. Cl.$^6$ .......................... B60Q 1/00

[52] U.S. Cl. .......................... 362/61; 362/293; 362/311

[58] Field of Search .......................... 362/61, 256, 293, 362/299, 301, 310, 311

[56] References Cited

U.S. PATENT DOCUMENTS

| | | | |
|---|---|---|---|
| 3,598,989 | 8/1971 | Biggs | 240/41.3 |
| 5,113,320 | 5/1992 | Haydu | 362/61 |
| 5,169,224 | 12/1992 | Segoshi et al. | 362/61 |
| 5,180,218 | 1/1993 | Ohshio | 362/61 |
| 5,237,489 | 8/1993 | Stein et al. | 362/61 |
| 5,243,501 | 9/1993 | Makita et al. | 362/61 |
| 5,258,686 | 11/1993 | Segoshi et al. | 362/61 |
| 5,289,352 | 2/1994 | Remus et al. | 362/61 |
| 5,327,330 | 7/1994 | Van Oel et al. | 362/61 |

FOREIGN PATENT DOCUMENTS

| | | |
|---|---|---|
| 005444A1 | 10/1981 | European Pat. Off. . |
| 0591015A1 | 4/1994 | European Pat. Off. . |
| 2601111 | 7/1986 | France . |
| 1705304 | 6/1955 | Germany . |
| 1738894 | 12/1956 | Germany . |
| 3415442A1 | 10/1984 | Germany . |
| 3703129A1 | 8/1988 | Germany . |
| 4410038A1 | 9/1994 | Germany . |
| 859197 | 1/1961 | United Kingdom . |
| 2276441A | 9/1994 | United Kingdom . |

*Primary Examiner*—Denise L. Gromada
*Assistant Examiner*—Alfred Basichas
*Attorney, Agent, or Firm*—Griffin, Butler Whisenhunt & Kurtossy

[57] ABSTRACT

A headlight has an adjustable reflector (1) which is mounted in a housing (2) closed by a light-transmissive shield (3). An opaque-baffle frame (5) surrounding the reflector extends between the reflector and the light-transmissive shield. The opaque-baffle frame supports a light-transmissive screen (4) on its rear side. A front surface of the light-transmissive screen borders on an inner edge (6) area of the opaque-baffle frame directed toward the reflector. At the bottom of a mounting area of a lamp (18) the light-transmissive screen is positioned behind an outer edge area (7) of the opaque-baffle frame. The outer edge area of the opaque-baffle frame is attached to an outer edge of the housing. The light-transmissive screen is held against movement in all directions on the rear side of the opaque-baffle frame by a shaped interlocking coupling between its outer edge and the opaque-baffle frame.

10 Claims, 3 Drawing Sheets

HEADLIGHTS FOR MOTOR VEHICLES

BACKGROUND OF THE INVENTION

This invention relates to a headlight for use with motor vehicles of a type having a reflector, a housing for receiving the reflector, a light-transmissive shield for closing a front side of the housing, a light-transmissive screen arranged between the reflector and the light-transmissive shield, and an opaque-baffle frame surrounding the light-transmissive screen with an outer edge portion thereof being mounted on the housing and an inner edge portion thereof extending toward an outer edge of the reflector.

Such a headlight for a motor vehicle is disclosed in French Patent 26 01 111. This headlight has a two part pot-shaped housing in which two, rigidly attached to one another, adjustable, reflectors are mounted. A front side of the pot-shaped housing is closed by a bowl-shaped light-transmissive shield. A surrounding edge of the light-transmissive shield is mounted in a groove of an outer edge of the pot-shaped housing. The housing includes a rearward part for supporting both reflectors and an intermediate part arranged between the rearward part and the light-transmissive shield. An opaque-baffle frame is formed on a front edge of the intermediate part of the housing, with the intermediate part receiving the light-transmissive shield, the opaque-baffle frame bulging convexly toward the front side of the headlight. An outer edge area of the convex opaque-baffle frame, which is formed on the housing, extends into the bowl-shaped light-transmissive shield and its inner edge area is directed toward the surrounding outer edge of both reflectors. One of the two reflectors supports, by means of a frame on its front edge, a light-transmissive screen. Such a light-transmissive screen attached to a front edge of a reflector, because of the close position of the reflector to the lamp, receives a great heat load and, because of this, is usually formed of glass. Light screens of glass, however, have great weight and therefore the reflector, and elements for attaching it to the housing, must be correspondingly sturdy in order to hold the reflector and the light-transmissive screen vibration free in a motor vehicle. The opaque-baffle frame shades light between the outer edge of both reflectors and the sidewall of the housing in the interior of the headlight. A gap exists between the outer edges of both reflectors and the inner edge area of the opaque-baffle frame because the reflectors are pivotal. Therefore, and because the edges of the reflectors which impinge on one another are not shaded by the opaque-baffle frame, the outer edge of the light-transmissive screen and the outer edge of the reflector which receives the light-transmissive screen are easy to see. This disturbs the harmonic optical impression of the headlight. This is particularly the case in the headlight of German Patent Publication DE 44 10 038 A1, because in this case, for one thing, no opaque-baffle frame is used and for another thing attaching elements of a light-transmissive screen, because of the light-transmissive screen's mounting, are easy to see. The light-transmissive screen is plate-shaped, that is, it has no side edge which is directed toward a headlight rear side. Such light-transmissive screens can have, because of manufacturing procedures, an irregular frosted outer edge. The benefit thereof is that, also for a glass light-transmissive screen, between an edge of a reflector and the light-transmissive screen, a groove-spring connection can be employed.

A headlight for a motor vehicle is disclosed in European Patent EP 0 054 444 in which an opaque-baffle frame is made either as one piece with the housing or as a separate piece, and a surrounding inner edge area of the opaque-baffle frame is directed toward an outer edge of a single reflector. For a separate opaque-baffle frame the housing can have a smaller opening on its rear side.

German Patent Publication DE 37 03 129 A1 discloses a headlight in which a unit of two headlights is mounted in a pot-shaped housing closed by a light-transmissive shield. The unit is coupled with the housing to be adjustable and includes two adjacently arranged headlights, one of which operates using projection principles while the other has an exclusively light-bundling, or bunching, bowl-shaped, reflector. An opaque-baffle part is formed laterally to a bowl-shaped reflector, surrounding a lens of the headlight which operates according to projection principles. The opaque-baffle part has a cantilevered attachment to the bowl-shaped reflector and supports in its opening, behind which the lens is arranged, a light-transmissive screen. Because the opaque-baffle part is cantilevered to the reflector and also supports the light-transmissive screen, the light-transmissive screen, particularly for a motor vehicle, is not held vibration free if the light-transmissive screen is constructed of a heavy material, such as glass for example.

It is an object of this invention to provide a headlight of the type described in the opening paragraph above in which a light-transmissive screen is not mounted on a front edge of a reflector, so that the reflector and elements for attaching it to the housing can be constructed to be lighter in weight, rather, the light-transmissive screen is supported on an opaque-baffle frame which holds the light-transmissive screen vibration free, even in motor vehicles and even if the opaque-baffle frame has a thin wall, such that neither elements for attaching nor an outer edge of the light-transmissive screen can be seen from a front side of the headlight, and the light-transmissive screen can be simply and easily coupled to the opaque-baffle frame.

SUMMARY OF THE INVENTION

According to principles of this invention, a light-transmissive screen of such a headlight: has a front surface which borders on an inner edge portion of an opaque-baffle frame that is directed toward the reflector, is positioned in the interior of the headlight behind a rear side of an outer edge portion of the opaque-baffle frame, and is held on the rear side of the opaque-baffle frame in all directions by a shaped interlocking connection between its outer edge and the opaque-baffle frame.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
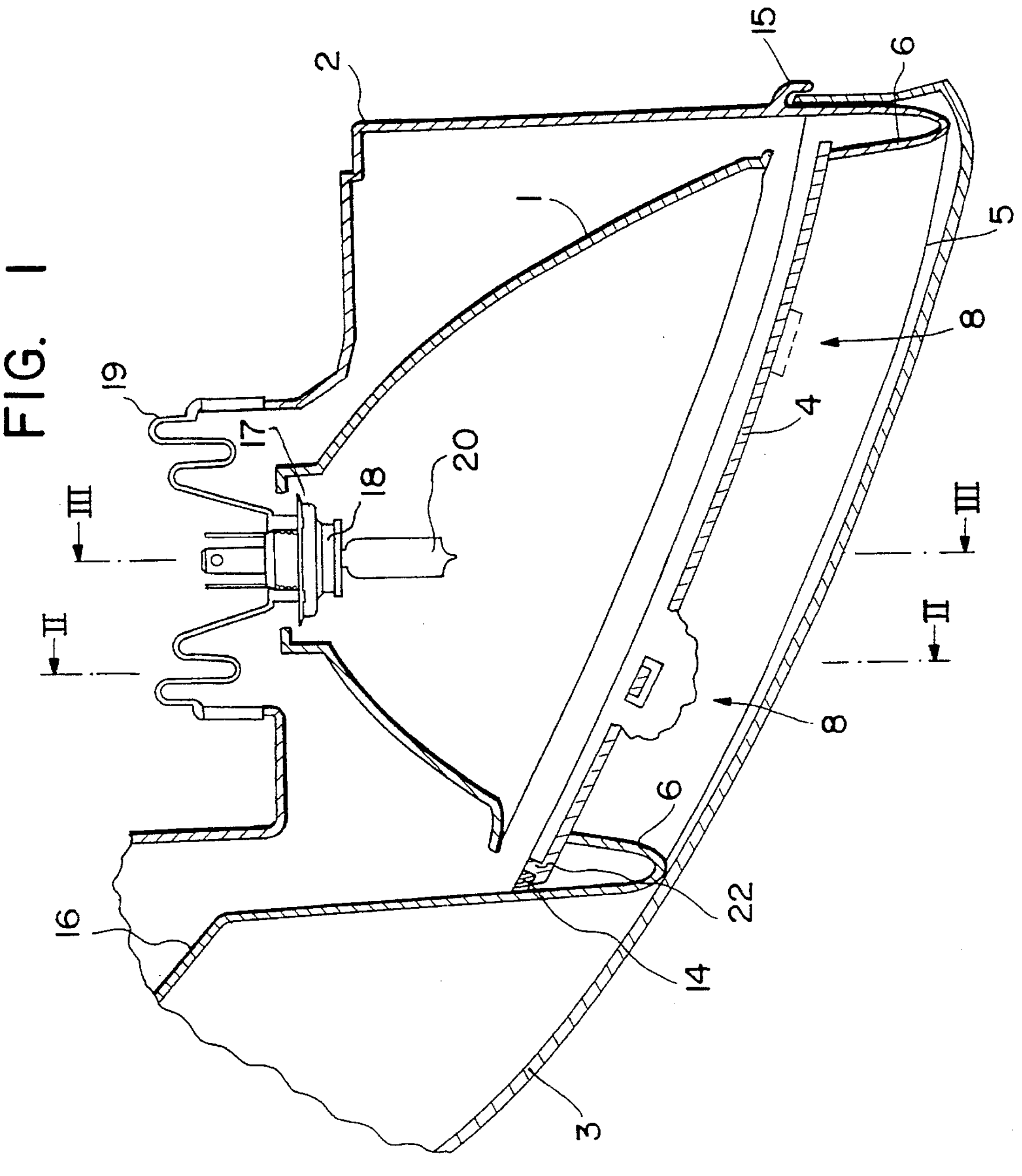
FIG. 1 is a center, vertical, lengthwise, cross sectional view of a headlight of a motor vehicle having features of this invention.
Figure 3:
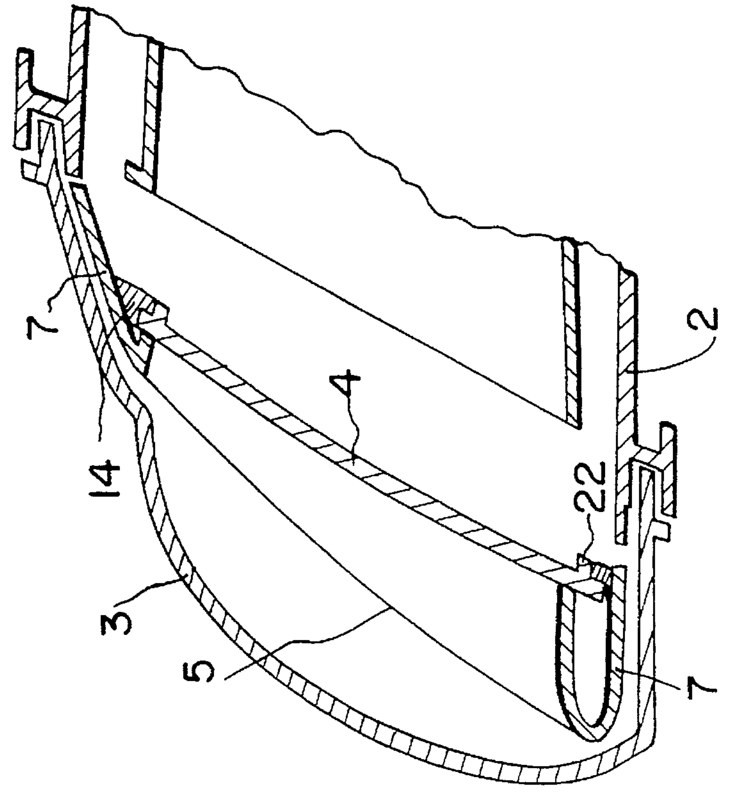
FIG. 3 is a cross sectional view taken on line III—III in FIG. 1.
Figure 2:
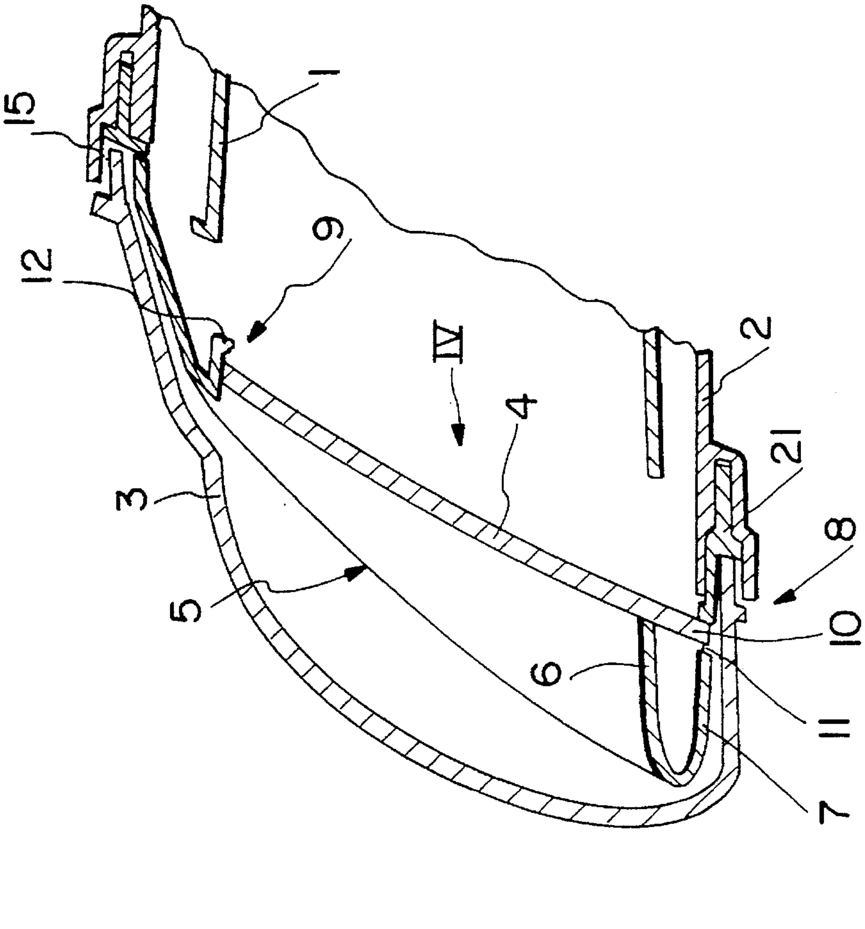
FIG. 2 is a cross sectional view taken on line II—II in FIG. 1.

A headlight has a pot-shaped housing 2 constructed of resinous plastic whose front opening is covered, or closed, by a light-transmissive shield 3, which is also constructed of resinous plastic. The light-transmissive shield 3 has a bowl-shape and its surrounding side edge is mounted in a receiving seat of an outer edge of the pot-shaped housing 2. Two bowl-shaped reflectors 1 and 16 are arranged beside one another in the pot-shaped housing 2. The reflector 16 is rigidly coupled to the housing 2 while the reflector 1 is adjustable, at least about one axis. The reflector 1 has an opening 17 in an area of its apex for receiving a lamp 18. The lamp 18 is surrounded at its rear by a rubber sleeve 19 whose outer surrounding edge is mounted on an edge of the housing 2 forming a housing opening at the rear side of the housing. The reflector 1 has a reflector surface such that light directed by the reflection surface on a driving lane is bounded by a light-dark boundary. Light beams which radiate forwardly from the lamp 18 are shaded by a cap 20 painted on a bulb of the lamp 18. So that the reflector 1 can have the largest possible reflection surface, its forward edge extends to be close to the outer edge of the housing 2.

The reflector 16 which is rigidly attached to the housing 2 is constructed as one piece of resinous plastic with an opaque-baffle frame 5 which surrounds the reflector 1. The opaque-baffle frame 5 has a convex shape bulging toward the light-transmissive shield 3. The opaque-baffle frame 5 has an outer edge area 7 which is mounted on an outer edge of the housing 2 and on the reflector 16 and an inner edge area 6 whose free edge extends toward an outer edge of the reflector 1. The outer edge area 7 which extends into the interior of the bowl-shaped light-transmissive shield 3 has holding clips 21 formed thereon which, are shoved into the receiving seat 15 of the housing 2 and is held therein, together with the light-transmissive shield 3, by an adhesive. The light-transmissive shield 3 is held against the housing 2 by a holding clamp, which is not shown in the drawings, until the adhesive has hardened in the receiving seat 15.

A light-transmissive screen 4, of glass, which can be provided with optical elements and has a plate-like shape (that is, it does not have a surrounding edge which is directed toward a rear side of the headlight), is fixedly mounted on a rear side of the opaque-baffle frame 5 by shaped interengagement 8, 9. The light-transmissive screen 4 is mounted before the opaque-baffle frame 5 is mounted on the housing 2. The light-transmissive screen 4 encloses the entire opening of the opaque-baffle frame 5 and has an irregularly formed and frosted, or matted, surface. An outer bottom edge of the light-transmissive screen 4 lies on an inner side, or surface, of the outer edge area 7 of the opaque-baffle frame 5, near an outer bottom edge of the housing 2. A shaped keyed connection, or interengagement, 8 formed of a groove-spring (or groove tab) coupling is formed between the bottom edge of the light-transmissive screen and the outer edge area 7 of the opaque-baffle frame 5. The spring, or tab, is a downwardly-projecting shoulder 10 of the light-transmissive screen 4 while the groove is a cavity 11 in the outer edge area 7 of the opaque-baffle frame 5. Laterally of the shoulder 10, edge portions of the light-transmissive screen 4 lie against the inner surface of the outer edge area 7 of the opaque-baffle frame 5. The light-transmissive screen 4 extends to the upper side of the opaque-baffle frame 5 and its front surface borders on the free edge of the surrounding inner edge area 6. Between the upper edge of the light-transmissive screen 4 and the inner edge area 6 of the opaque-baffle screen 5 there is a shaped interconnecting coupling 9 that comprises a self attaching, or guiding, mechanism. The self guiding mechanism includes a latch 12 formed at the free end of the inner edge area 6 which snappingly grips behind the light-transmissive screen 4 to engage its rear surface. When the light-transmissive screen 4 is mounted, the shoulder 10 is first placed in the cavity 11 and thereafter its upper edge is pivoted toward the opaque-baffle frame 5 until the latch 12, which is arranged in the cavity for the light-transmissive screen 4, snaps behind the light-transmissive screen 4. Notches 13 can be defined at an upper edge of the light-transmissive screen for receiving latches 12 (there are plural notches in a case where there is more than one latch). Two shaped interengagements 8 are developed between the light-transmissive screen 4 and the opaque-baffle frame 5 at the lower edge of the light-transmissive screen 4 and two shaped interconnecting couplings 9 are developed on the upper edge of the light-transmissive screen 4. In addition to the shaped interconnecting couplings 8 and 9, the outer edge of the light-transmissive screen 4 is adhered to the rear surface of the opaque-baffle frame, at the interior, or inner, surface, or side, of the outer edge area 7. An adhesive 14 that is used for this is at least partially, or intermittently, placed between the narrow edge surface of the light-transmissive screen 4 and the interior side of the outer edge area 7. So that the adhesive 14 dependably stays at the position provided for it, a rib 22 is formed on the rear surface of the light-transmissive screen 4 close to the outer edge of the light-transmissive screen 4. A lateral edge of the light-transmissive screen 4, adjacent the reflector 16, extends the reflector 16 and is also glued, or adhered, to this reflector. The adherence of the light-transmissive screen with the opaque-baffle frame 5 is particularly important if the light-transmissive screen 4 extends at an angle toward the rear side of the headlight, as does the light-transmissive shield 3.

Figure 5:
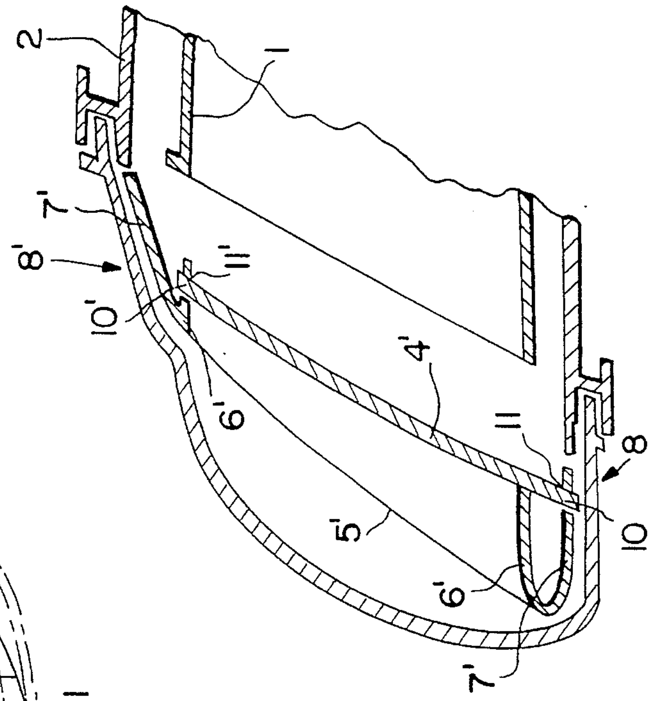
FIG. 5 is a view similar to FIG. 2 of a second embodiment of this invention in which there is another type of shaped interlocking between a light-transmissive screen and an opaque-baffle frame of a headlight.
Figure 4:
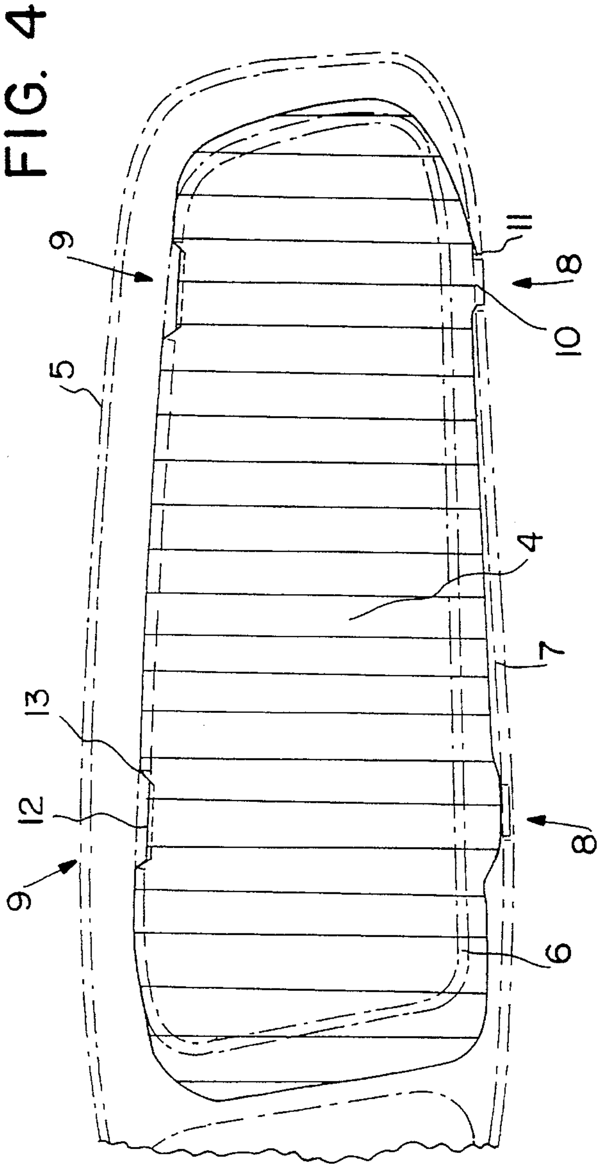
FIG. 4 is an elevational view of a light-transmissive screen of this invention taken from a direction IV shown in FIG. 2, with peripheral elements being shown in dot-dash lines.

In FIG. 5, a light-transmissive screen 4' is coupled to an opaque-baffle frame 5' at its lower, or bottom, edge as well as at its upper edge, by means of groove-spring couplings 8 and 8'. The groove-spring coupling 8 is developed at the bottom, or lower, side of the opaque-baffle frame 5', in the manner depicted in FIGS. 1 and 4, between the lower edge of the light-transmissive screen 4' and the outer edge area 7' of the opaque-baffle frame 5', while, at the upper side of the opaque-baffle frame 5', the groove-spring coupling 8' between the upper edge of the light-transmissive screen 4' and the inner edge area 6' of the opaque-baffle frame 5' exists. When this is the case, the shoulders 10' of the upper groove-spring coupling 8' of the light-transmissive screen are first shoved into cavities 11' of the inner edge area 6' of the opaque-baffle frame 5' and thereafter the lower edge of the light-transmissive screen 4' is pivoted toward the opaque-baffle frame 5' until the shoulders 10 of the lower groove-spring coupling 8 self-guidingly snaps into the corresponding cavities 11 of the outer edge area 7'. When this is done, the edges of the lower and both lateral sides of the inner edge area 6' of the opaque-baffle frame 5' lie, under tension, on the front surface of the light-transmissive screen 4' with the shaped interconnected couplings 8 and 8' serving as abutments. So that the light-transmissive screen 4 can be easily and simply mounted, the opaque-baffle frame should be manufactured of a resinous plastic which has appropriately elastic properties.

The light-transmissive screen is, even when it is manufactured of a heavy material such as glass, for example, held to be vibration free because it is supported on the housing-mounted outer opaque-baffle frame, and the housing (particularly at the front), the light-transmissive shield, and the receiving edge of the interior edge area of the opaque-baffle frame have great stiffness. The inner edge area of the opaque-baffle frame should at least completely cover the lower and both lateral edges of the light-transmissive screen because these can be otherwise seen from above (at an angle). The opaque-baffle frame thereby serves not only to cover the gap between the reflector and housing, but also to cover the outer edge of the light-transmissive screen and its attaching elements. Further, the inner edge area of the opaque-baffle frame can have a small spacing from the front surface or it can lie against it. From the front side of the headlight the overall appearance is quite harmonic if the light-transmissive screen is provided with optical elements which do not allow a view into the interior of the headlight.

The light-transmissive screen is attached to the opaque-baffle frame in a particularly uncomplicated manner, to be rattle free, if the inner edge area of the opaque-baffle frame is made to lie on the front surface of the light-transmissive screen between attaching elements of the shaped interconnecting couplings. When this in done, the opaque-baffle frame should be constructed of an elastically flexible resinous plastic. For headlights with an extremely angled light-transmissive shield, it is beneficial that the inner edge area of the lower side of the opaque-baffle frame lies, under tension, against the front surface of the light-transmissive screen because, for an extremely angled light-transmissive shield, the opaque-baffle frame has a wider inner edge area at its lower side than at its upper side. In this regard, it is beneficial for the inner edge area which lies against the front surface of the light-transmissive screen to be made to spring perpendicular to a mounting direction to the light-transmissive screen.

A self attaching and/or a groove-spring coupling can serve as a shaped interconnecting coupling between the light-transmissive screen and the opaque-baffle frame. The light-transmissive screen can have at each of its lower and upper edges respectively at least one groove-spring attachment or at one edge at least one groove-spring attachment and at the opposite edge at least one self-guiding snap engagement.

The light-transmissive screen is particularly securely attached to the rear side of the opaque-baffle frame if an adhesive is placed between at least a portion of the light-transmissive screen's outer edge and a rear side of the opaque-baffle frame. This is particularly beneficial during an automated fabrication because the light-transmissive screen is held in its exact position by the shaped interconnected coupling until the adhesive has hardened; that is, the adhesive can harden even after the headlight has been packed. In a particularly beneficial further embodiment of the invention the opaque-baffle frame is a separate part attached to the front housing edge. The light-transmissive screen should be attached with the opaque-baffle frame before the opaque-baffle frame is mounted in the housing because the opaque-baffle frame is radially more elastically flexible before it has been mounted and thereby the shaped interconnecting coupling between it and the light-transmissive screen can be easily accomplished, while after the opaque-baffle frame has been mounted in the housing, the outer edge area of the opaque-baffle frame is, supported by the housing and is thereby stiffened.

While the invention has been particularly shown and described with reference to a preferred embodiment, it will be understood by those of ordinary skill in the art that various changes in form and detail may be made therein without departing from the spirit and scope of the invention.

The invention claimed is:

1. A headlight for a vehicle including a reflector, a housing for receiving the reflector, a light-transmissive shield for closing a front side of the housing, a light-transmissive screen arranged between the reflector and the light-transmissive shield, and an opaque-baffle frame surrounding the light-transmissive screen with an outer edge area thereof being mounted on the housing and an inner edge area thereof extending toward an outer edge of the reflector;

wherein the light-transmissive screen has a front surface which borders on the inner edge area of the opaque-baffle frame that is directed toward the reflector in an interior of the headlight, the light-transmissive screen being positioned behind a rear side of the outer edge area of the opaque-baffle frame, and being held on the rear side of the opaque-baffle frame, against movement in all directions, by a shaped interlocking connection between its outer edge and the opaque-baffle frame.

2. A headlight as in claim 1 wherein the inner edge area of the opaque-baffle frame lies, under tension, against a front surface of the light-transmissive screen between attaching elements of the shaped interconnecting coupling.

3. A headlight as in claim 2 wherein a bottom portion of the inner edge area of the opaque-baffle frame lies, under tension, against the front surface of the light-transmissive screen.

4. A headlight as in claim 1 wherein the shaped interconnecting connection comprises at least one self-guidingly latching mechanism.

5. A headlight as in claim 1 wherein the shaped interconnecting connection comprises a groove-tab coupling.

6. A headlight as in claim 5 wherein the groove-tab coupling is formed between an edge of the light-transmissive screen and the outer edge area of the opaque-baffle frame, while there is also a self-guiding latching device between an opposite edge of the light-transmissive screen and the opaque-baffle frame.

7. A headlight as in claim 5 wherein the groove-tab coupling is formed by a shoulder on the edge of the light-transmissive screen and a correspondingly-sized cavity formed at an edge area of the opaque-baffle frame.

8. A headlight as in claim 6 wherein the latching device is formed by a latch on the inner edge area of the opaque-baffle frame which grips into a notch of an upper edge of the light-transmissive screen and behind a rear-side surface of the light-transmissive screen.

9. A headlight as in claim 1 wherein an outer edge of the light-transmissive screen is at least partially attached to a rear side of the opaque-baffle frame by adhesives.

10. A headlight as in claim 1 wherein the opaque-baffle frame is formed of a separate part attached to a front housing edge.

* * * * *